Patented July 4, 1950

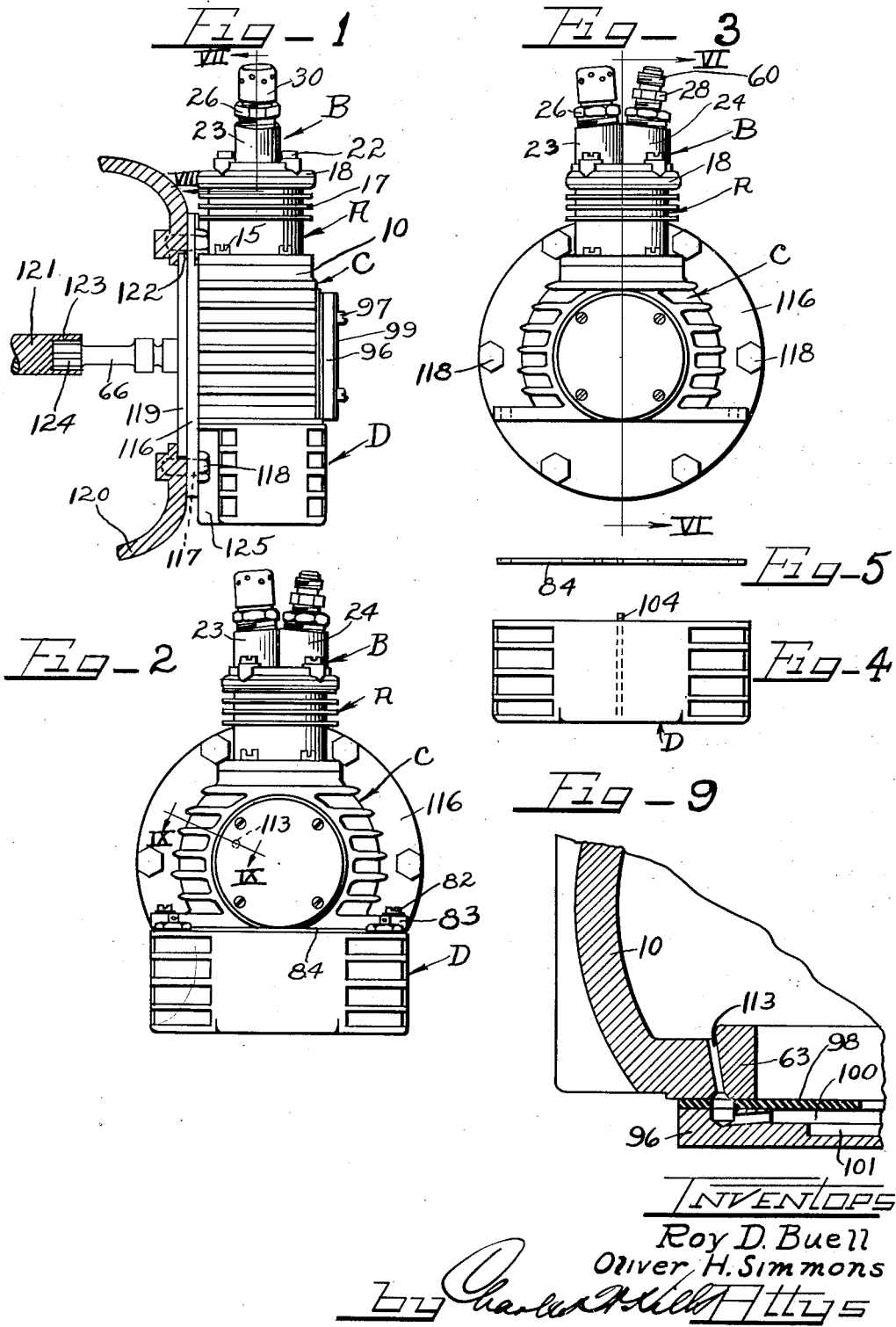

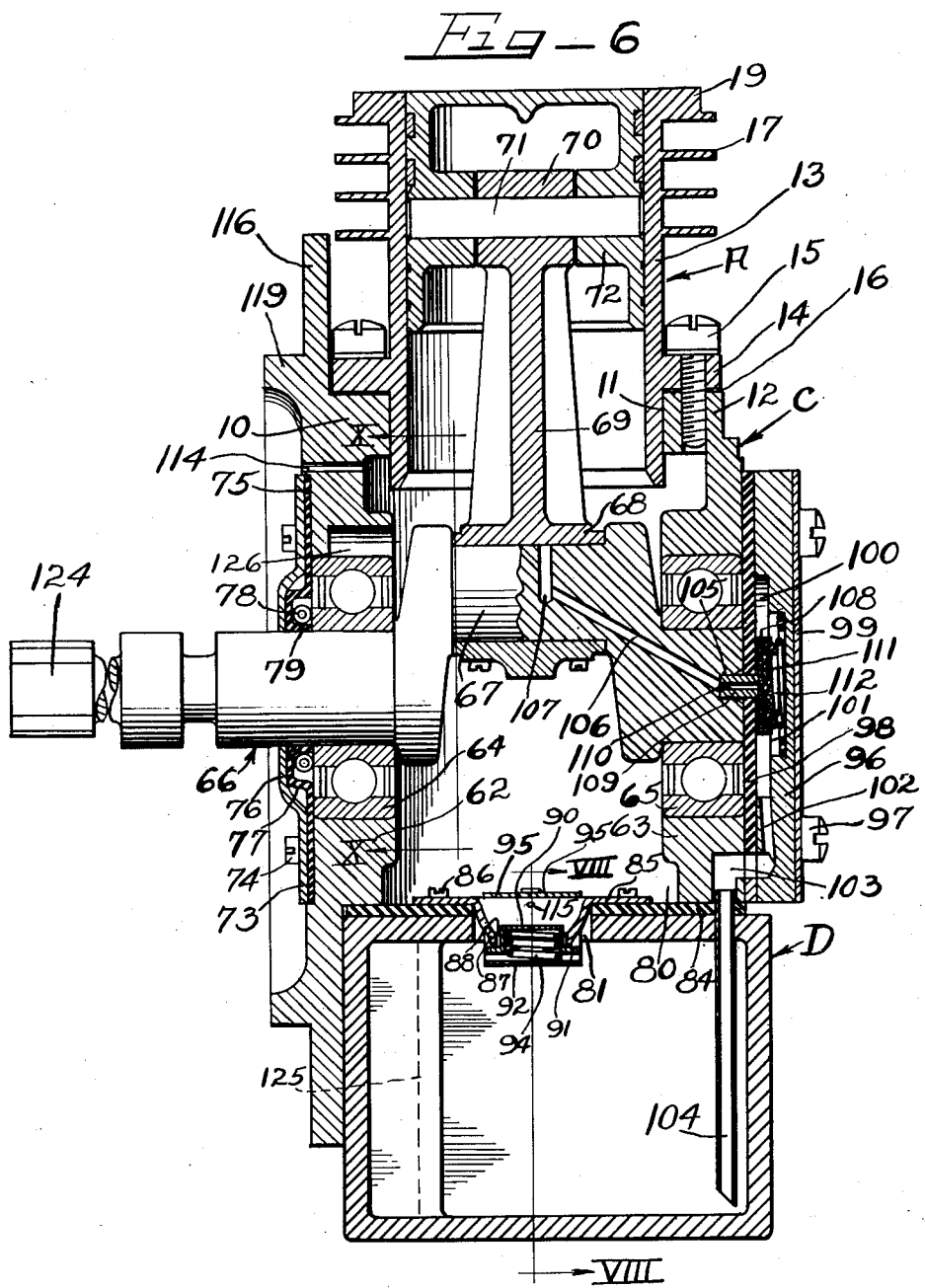

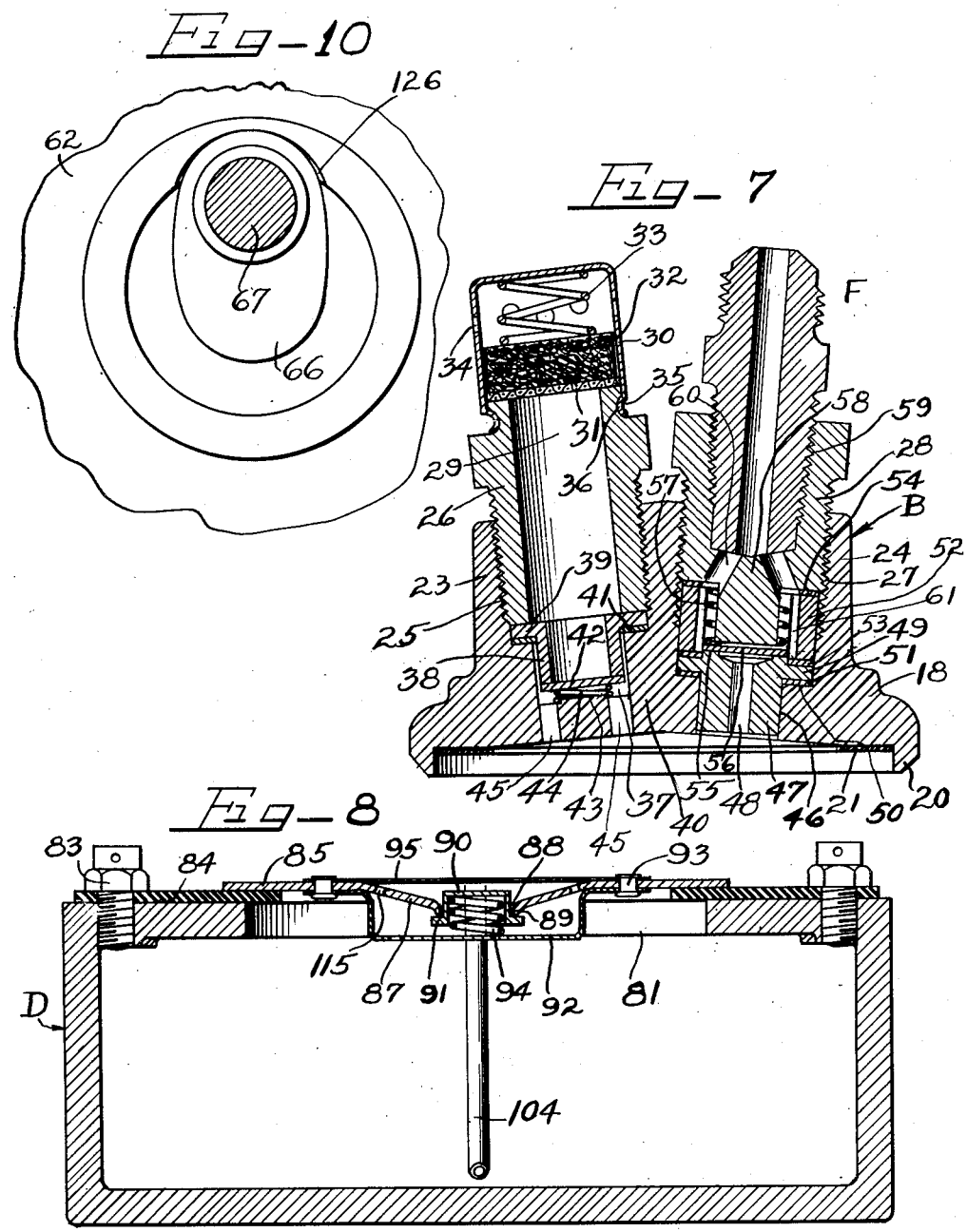

2,513,547

UNITED STATES PATENT OFFICE 2,513,547

COMPRESSOR

Roy D. Buell and Oliver H. Simmons, Chicago, Ill.; said Simmons assignor to said Buell Application December 6, 1943, Serial No. 513,060

9 Claims. (Cl. 230—206)

This invention relates to compressors adapted for general use but more particularly for service in aircraft for delivering air under pressure to the various air operated controls and devices.

An important object of the invention is to provide an air compressor which is compact and of minimum weight for the desired maximum output and which can be quickly and easily installed for service or removed from its service position and which can be quickly dismantled for inspection, replacement or repairs of operating parts, or for cleaning and re-servicing.

Another important object is to provide a compressor of the crank shaft and reciprocating piston type in which the cylinder element, the valve element, the crank case element, and the oil reservoir element are all separately manufactured and detachably secured together.

A further important object is to provide on the crank case element a full ring flange concentric with the crank shaft for direct mounting of the compressor on the frame of an engine or other driving source for direct driving coupling between a driven shaft and the end of the crank shaft extending from the compressor.

Still a further important object is to provide an improved lubricating system for the compressor in which, during operation of the compressor, air is forced from the crank case into the reservoir to exert pressure against the lubricating oil for regulated flow thereof through the crank shaft and to the bearing surfaces of the crank shaft and the connecting rod.

The above referred to and other important features of the invention are embodied in the structure shown on the drawings, on which drawings Figure 1 is a side elevation of the compressor mounted on a support;

Figure 2 is a front view of the compressor;

Figure 3 is a front view with the reservoir structure removed;

Figure 4 is a front view of the reservoir showing the location of the lubricant outflow tube;

Figure 5 is an end view of the washer between the reservoir and the crank case;

Figure 6 is an enlarged section on plane VI—VI Figure 3;

Figure 7 is an enlarged section on plane VII—VII Figure 1 of the cylinder head and valve structure thereon;

Figure 8 is a section on plane VIII—VIII of Figure 6;

Figure 9 is an enlarged section on plane IX—IX of Figure 2; and

Figure 10 is a section on plane X—X of Figure 6,

The compressor shown comprises the cylinder structure A, the valve structure B, the crank case structure C, and the reservoir structure D, these structures being all detachably secured together. The crank case structure comprises the substantially annular wall 10 having the top opening 11 surrounded by the seat flange 12. Into the opening 11 extends the cylinder wall 13 of the cylinder structure A, this wall having the flange 14 engaging the seat flange 12 and detachably secured thereto as by screws 15, a sealing washer 16 being interposed. At its outer end the cylinder wall has the cooling fins 17 extending therefrom.

The valve structure comprises the body 18 which forms a head for the cylinder 13, the head seating on the flange 19 at the upper end of the cylinder, the depending rim 20 on the head receiving the outer edge of the cylinder flange. A suitable gasket 21 is interposed between the head and the cylinder flange and the head is detachably secured to the cylinder as by bolts 22.

The cylinder head 18 has the upwardly extending cylindrical bosses 23 and 24, the boss 23 having the threaded bore 25 for the inlet plug 26 for the inlet valve structure, while the boss 24 has the threaded bore 27 for the outlet plug 28 from the outlet valve structure. The plug 26 has the bore 29 therethrough, an inlet cap 30 being mounted on the top of the plug. Air filtering and cleaning material is contained within the cap 30, and as shown, comprises a disk 31 of brass wire mesh and a disk 32 of felt, the filter disk 31 being seated against the outer end of the plug. A spring 33 within the cap maintains pressure against the filtering assembly, and air may be drawn into the inlet openings 34 in the cap. The cap may be secured in position by spinning its lower end 35 into the circumferential groove 36 surrounding the end of the plug.

Below the bore 29 of the inlet plug is the inlet valve chamber 37. The annular valve seat member 38 extends down into the valve chamber and is held in place by clamping of its flange 39 between the lower end of the plug 26 and the shoulder 40 between the bore 25 and the valve chamber, a sealing gasket 41 being interposed between the flange and the shoulder. The valve seat member is preferably of stainless steel and its inner end forms a seat for the inlet valve disk 42 which is preferably of Monel metal. Projecting upwardly into the valve chamber 37 concentric therewith is a circular boss 43 which is surrounded by the lower end of a spring 44 which abuts the valve disk and tends to hold it seated against the seat member. Between the boss 43 and the sides of the valve chamber inlet ports 45 extend through the head 18 to connect the valve chamber with the interior of the cylinder. The boss 43 also serves to limit the opening movement of the valve disk by the inflowing air.

Extending through the cylinder head 18 concentric with the bore 27 but of lesser diameter, is the opening 46 which receives the seat member 47 having the outflow passageway 48 therethrough. The flange 49 extends from the seat member 47 a distance downwardly from its outer end and this flange seats against the shoulder 50 between the bore 27 and the opening 46, with a sealing gasket 51 interposed. Within the bore 27 above the seat member flange 49 is a spacer ring 52 for engagement by the plug 28 to hold the seat member securely in the opening 46. A sealing gasket 53 is preferably interposed between the ring and the flange 49 and another gasket 54 is interposed between the ring and the end of the plug.

The outer end of the seat member forms the seating face 55 for the valve disk 56. The valve seat member is preferably of stainless steel and the valve disk preferably of Monel metal. The diameter of the valve disk is such that it may readily slide in the spacer ring 52 and the disk is normally held seated by a spring 57 between the disk and the end of the plug 28. The plug has a cylindrical boss 58 extending therefrom concentric therewith which serves to hold the spring in alignment and which also serves as an abutment for the valve disk to limit its unseating movement.

The plug 28 has the threaded bore 59 for receiving a coupling fitting F from which tubing (not shown) may extend to the devices to be controlled by the compressed air delivered by the compressor. Outlet ports 60 extend through the base of the plug 28 to connect the coupling fitting 60 with the space above the valve disk, the spacer ring 52 having longitudinally extending passages 61 in its inner side through which the air discharged from the compressor may flow to the ports 60 and through the outlet coupling fitting when the valve disk is raised from its seat.

The rear and front end walls 62 and 63 of the crank case frame 10 have openings for receiving the anti-friction bearing assemblies 64 and 65, respectively, these bearings receiving respectively, the outer and inner ends of the crank shaft 66 whose crank section or pin 67 receives the bearing head 68 of the connecting rod structure 69 whose upper bearing head 70 receives the cross pin 71 of the piston 72 which operates within the cylinder 13. The ball bearing assemblies are pressure fitted into the openings of the end walls and are of the closed type in order to be filled with lubricant.

An annular sealing plate 73 receives the outer end of the crank shaft and is detachably secured to the end wall 62 as by screws 74, and between the plate and the wall 62 is interposed a sealing gasket 75 of leather or other suitable material. The middle portion 76 of the plate 73 is deflected or domed outwardly to receive the corresponding outwardly deflected middle portion 77 of the gasket 75. The deflected portion of the gasket receives the spring 78, this spring exerting inward radial pressure against the inner end 79 of the gasket which is deflected inwardly to surround the crank shaft, this sealing engagement preventing leakage of air or lubricant to the exterior along the outer end of the crank shaft.

At its lower end the crank case wall 10 has the laterally extending substantially rectangular opening 80 which communicates with the passageway 81 in the top wall of the reservoir structure D which is detachably secured to the crank case wall as by screws 82 extending through ears 83 on the crank case wall. A sealing gasket 84 of cork or other suitable material is preferably interposed between the crank case and the reservoir structure.

As best shown on Figures 6 and 8, the passageway 81 in the top of the reservoir structure is spanned by a check valve supporting assembly. This assembly comprises the oblong metal plate 85 extending over the passageway and secured as by screws 86, the central portion of the plate being deflected downwardly to form a sump or trough 87. This trough at its bottom is pierced and deflected down to form the flow passageway 88 and the annular valve seat 89. A cup-shaped valve 90 extends upwardly through the passage 88, the flange 91 of the cup being engageable with the seat 89. A U-shaped abutment member 92 extends below the trough 87 and is secured to the plate 85 as by riveting 93, this abutment member supporting the spring 94 which extends upwardly into the valve cup and tends to hold the cup flange 91 against the seat 89 to close the passageway 88. The spring is comparatively light so that during downward movement of the piston in the cylinder air flows from the closed crank case into the reservoir to exert pressure against the lubricating oil therein. A splash plate 95 extends across the top of the trough portion 87 and may be secured to the plate 85 by the same rivets that secure the abutment member 92. The plate 95 is slightly less in width than the mouth of the trough 87 so that the plate substantially covers the trough but leaves sufficient clearance at its sides for the passage of air from the crank case into the reservoir.

The lubricating oil within the reservoir is to be forced by the air pressure for flow to the crank shaft bearing connection with the connecting rod. Referring to Figure 6, a circular plate 96 is secured as by screws 97 to the end wall 63 of the crank case, with a sealing washer 98 of suitable material interposed, and these screws may also secure a name plate 99 against the outer side of the plate 96. In its inner side the plate 96 has the inner recess or chamber 100 communicating with the outer recess 101 of lesser diameter. A passageway 102 connects the chamber 100 with the passageway 103 formed in the end wall 63 of the crank case, and an oil tube 104 extends upwardly from the bottom of the reservoir through the top thereof and into the passageway 103 so that oil may flow up from the reservoir into the chamber 100.

In the inner end of the crank shaft 66 is the axially extending cylindrical recess 105 which is connected by the passageway 106 through the crank shaft with the radially extending passage 107 in the crank section, the passageway 106 being drilled diagonally through the crank shaft from the recess 105 to the passage 107. Within the chamber 101 in the plate 96 is a cup 108 to whose bottom is secured a short tube 109 through which and through the cup bottom extends a metering flow passage or orifice 110, the tube extending into the recess 105 for communication of the orifice with the passageway 106 through the crank shaft. Within the cup 108 is a pad 111 of filtering material which is engaged by the spring 112 seated in the outer recess 101 in the plate 96, the spring tending to hold the cup in sealing engagement against the washer 98 with the tube 109 within the recess 105. The tube 109 has bearing fit in the recess 105 and remains stationary while the crank shaft is being rotated. When the compressor is in operation and air is forced into the reservoir above the oil, this oil is forced upwardly through the tube 104 and through the passage 102 into the chamber 100 in the plate 96 and from there through the filter pad and the tube 109 into and through the passages 106 and 107 for lubrication of the bearing between the connecting rod and the crank shaft, the pad filtering the oil before delivery to the bearing. A vent outlet 113 is preferably provided from the chamber 100 into the crank chamber, this vent passageway being shown on Figures 2 and 9. During operation of the compressor, the oil will be forced upwardly from the reservoir into and through the chamber 100 and into the crank case, the outlet 113 sufficiently restricting the outflow from the chamber 100 so that there will be sufficient predetermined pressure in the chamber for forcing the oil through the orifice in the tube 109 and through the crank case to the connecting rod bearing thereon. A more or less restricted vent passage 114 is also provided for the crank case, this passage being shown as extending through the end wall 62 of the crank case, Figure 6. A bleed hole 115 may also be provided through the trough 87 near the upper end thereof and below the cover plate 95, as clearly shown on Figure 8.

The rear end wall 62 of the crank case has the continuous circular flange 116 extending therefrom and provided with holes 117 for receiving screws or bolts 118, and a centering boss 119, concentric with the flange, extending from the end wall 62. Figure 2 shows the compressor mounted on the housing 120 of a driving source, such as a hydrocarbon engine, which drives a shaft 121 terminating near an opening 122 in the housing which opening will receive the centering boss 119 for alignment of the compressor crank shaft 66 with the drive shaft 121 for coupling of the shafts in any suitable manner. As shown, the drive shaft terminates in a splined bore 123 for receiving the splined end 124 of the compressor crank shaft. After insertion of the centering boss 119, the bolts 118 are applied to secure the flange 116 and thereby the compressor structure rigidly to the housing 120. In order that the screws or bolts 118 may be readily manipulated, the reservoir is of reduced width at its ends to leave the recesses 125 behind the holes 117 through the lower part of the flange 116.

When the compressor is in service, filtered air will be drawn into the cylinder past the inlet valve 42 during instroke of the piston, and during outstroke of the piston the air will be forced out past the discharge valve 66 into a pressure tank for delivery to the controls or other devices to be operated by compressed air. During the instroke of the piston the air within the crank case will be put under pressure and caused to flow past the check valve 90 into the reservoir D above the lubricating oil, which will then be forced upwardly through the tube 104 and through the side oil chamber 100 and through the vent 113 back into the crank case, a portion of this oil under pressure flowing through the metering orifice 110 and through the crank shaft to the bearing between the crank shaft and the connecting rod, the metering passage 110 preventing undue flow of oil through the crank shaft to the bearings. Some of the oil will escape from the bearing between the connecting rod and the crank shaft and will be thrown upwardly by centrifugal force into the cylinder and towards the bearing connection between the connecting rod and the piston for lubrication of the cylinder and bearing. Surplus oil will drop back into the crank case and into the sump trough 87 for flow back into the reservoir when the check valve 90 is opened. Thus, there will be a constant circulation of lubricating oil under pressure to the bearing surfaces. During outstroke of the piston, suction within the crank case may be effective through the vent passageway 113 to draw oil up from the reservoir into the chamber 100 to keep this chamber filled and free of air. The vent passage 114 from the crank case to the exterior will serve to prevent undue build up of pressure or suction within the crank case but will not interfere with the circulation of the lubricating oil. The vent 115 in the sump trough 87 will function to prevent undue pressure build up in the reservoir, and the cover plate 95 for the sump will prevent oil from splashing out of the sump trough during the upstroke of the piston.

Referring to Figures 6 and 10, a clearance recess 126 is provided in the end wall 62 for the outer crank arm of the crank shaft to facilitate centering of the crank shaft during assembly and engagement of the inner end of the shaft with the outer bearing and the oil tube 109.

We have shown a practical and efficient embodiment of our invention but we do not desire to be limited to the exact construction, arrangement and operation shown and described, as changes and modifications may be made without departing from the scope of the invention.

We claim as follows:

1. An air compressor comprising a closed crank case, a crank shaft within said crank case journaled at its inner end in the front end wall of the crank case with its outer end extending through the rear end wall of the crank case for connection with a driving source, a cylinder mounted on said crank case having a piston therein connected by a connecting rod with said crank shaft, a cylinder head on said cylinder and inlet and outlet valve structure thereon, means defining a reservoir space for lubricating oil below said crank case, a check valve between said reservoir space and said crank case through which air is pumped by said piston from said crank case into said reservoir space to subject the oil therein to pressure, means defining an oil chamber on said crank case opposite the inner end of said crank shaft, means for conducting oil from said reservoir space into said chamber under pressure of the air in said space, said crank shaft having an axially extending recess in its inner end, and a passageway extending diagonally through said crank shaft from said recess to the engaging surfaces of said crank shaft and connecting rod, and a metering tube extending from said chamber into said recess for conducting oil from said chamber to said passageway for lubricating said engaging surfaces.

2. An air compressor comprising a closed crank case, a crank shaft within said crank case journaled at its inner end in the front end wall of the crank case with its outer end extending through the rear end wall of the crank case for connection with a driving source, a cylinder mounted on said crank case having a piston therein connected by a connecting rod with said crank shaft, a cylinder head on said cylinder and inlet and outlet valve structure thereon, means defining a reservoir space for lubricating oil below said crank case, a check valve between said reservoir space and said crank case through which air is pumped by said piston from said crank case into said reservoir space to subject the oil therein to pressure, means defining an oil chamber on said crank case opposite the inner end of said crank shaft, means for conducting oil from said reservoir space into said chamber under pressure of the air in said space, said crank shaft having an axially extending recess in its inner end, and a passageway extending diagonally through said crank shaft from said recess to the engaging surfaces of said crank shaft and connecting rod, a metering tube extending from said chamber into said recess for conducting oil from said chamber to said passageway for lubricating said engaging surfaces, and a filtering pad spring pressed over the outer end of said tube for filtering the oil before flow to said engaging surfaces.

3. An air compressor comprising a closed crank case, a crank shaft within said crank case terminating at its inner end in one end wall of the crank case with its other end extending outwardly through the opposite end wall for connection with a driving source, a cylinder mounted on said crank case and having a piston therein connected by a connecting rod with said crank shaft, inlet and outlet valve structure for said cylinder, means defining a closed lubricating oil reservoir space, a check valve between said reservoir space and said crank case through which air is pumped by the piston from the crank case to subject the oil in the reservoir space to pressure, a structure on said crank case adjacent the inner end of said crank shaft defining an oil chamber, means for conducting oil from said reservoir space into said oil chamber under the pressure of the air in said space, a restricted outflow passageway from said oil chamber into said crank case, said crank shaft having a recess extending axially thereinto from its inner end and a passageway extending diagonally through said crank shaft from said recess to the bearing surfaces between said crank shaft and connecting rod, a metering tube extending from said oil chamber into said recess for flow of oil to said crank shaft passageway to said bearing surfaces, a cup on the outer end of said tube, filter material in said cup for filtering the oil before flow from said cup into said tube, and spring means for holding said filter material in said cup and said cup in position for extension of said tube into said recess.

4. In a compressor of the type in which a crank shaft in a closed crank case reciprocates a piston within a cylinder connected with the crank case, a reservoir on the crank case having an inlet passage thereto from the crank case, a valve assembly for said passageway comprising a plate spanning said passageway and deflected to form a sump trough having an outlet opening at its bottom, a check valve for said outlet opening operable to permit flow into the reservoir of air displaced by the piston when the compressor is in service whereby a pressure head is maintained in the reservoir for subjecting lubricating oil in the reservoir to pressure, means defining a restricted path for conducting the oil under such pressure head from the reservoir to bearing surfaces within the compressor, and a cover for said sump trough for preventing splashing of oil therefrom back into the crank case.

5. In a compressor of the type in which a crank shaft in a closed crank case reciprocates a piston within a cylinder connected with the crank case, a reservoir on the crank case having an inlet passage thereto from the crank case, a valve assembly for said passageway comprising a plate spanning said passageway and deflected to form a sump trough having an outlet opening at its bottom, a check valve for said outlet opening operable to permit flow into the reservoir of air displaced by the piston when the compressor is in service whereby a pressure head is built up in the reservoir for subjecting lubricating oil in the reservoir to pressure, means defining a restricted path for conducting the oil under such pressure head from the reservoir to bearing surfaces within the compressor, a cover for said sump trough for preventing splashing of oil therefrom back into the crank case, there being a vent hole through the wall of said sump trough in shunt of said valve for preventing undue air pressure build-up in said reservoir.

6. An air compressor comprising a crank case of substantially annular horizontal cross section, a cylinder mounted on said crank case concentric therewith, a crank shaft within said crank case, a piston in the cylinder, a connecting rod connecting said crank shaft and piston, said crank shaft extending outwardly from one end of the crank case, and a continuous annular flange on said crank case concentric with said crank shaft and having bolt holes therethrough for direct mounting of the compressor on the housing of a driving source for connection of the crank shaft end with driving means within the housing.

7. An air compressor comprising a crank case of substantially annular horizontal cross section, a cylinder mounted on said crank case concentric therewith, a crank shaft within said crank case, a piston in the cylinder, a connecting rod connecting said crank shaft and piston, said crank shaft extending outwardly from one end of the crank case, a continuous annular flange on said crank case concentric with said crank shaft and having bolt holes therethrough for direct mounting of the compressor on the housing of a driving source for connection of the crank shaft end with driving means within the housing, and a lubricating oil reservoir housing mounted on the bottom of said crank case behind said flange, said reservoir housing being recessed for access to screws or bolts for securing the flange to a housing.

8. An air compressor comprising a closed crank case, a crank shaft within the crank case, a cylinder on the crank case, a piston operable in said cylinder and having bearing connection with said crank shaft, a restricted passageway for flow of air into or out of said crank case, a closed reservoir for lubricating oil and a passageway between said crank case and said reservoir, means providing an oil flow passageway for flow of oil from the reservoir into the crank case, the outflow end of said oil passageway being restricted, a check valve in the air passageway between said crank case and reservoir functioning to permit air flow from the crank case into the reservoir while checking return flow whereby upon reciprocation of said piston air will be pumped from the crank case into the reservoir to build up a pressure head in the reservoir above the oil therein and whereby the oil will be forced through said oil passageway for flow into the crank case, and means interposed between the inlet end and the outlet end of said oil flow passageway for diverting part of the pumped oil from said passageway for flow through said crank shaft bore.

9. An air compressor comprising a closed crank case, a crank shaft within the crank case, a cylinder on the crank case, a piston operable in said cylinder and having bearing connection with said crank shaft, a restricted passageway for flow of air into or out of said crank case, a closed reservoir for lubricating oil and a passageway between said crank case and said reservoir, means providing an oil flow passageway for flow of oil from the reservoir into the crank case, the outflow end of said oil passageway being restricted, a check valve in the air passageway between said crank case and reservoir functioning to permit air flow from the crank case into the reservoir while checking return flow whereby upon reciprocation of said piston air will be pumped from the crank case into the reservoir to build up a pressure head in the reservoir above the oil therein and whereby the oil will be forced through said oil passageway for flow into the crank case, and means interposed between the inlet end and the outlet end of said oil flow passageway for diverting part of the pumped oil from said passageway for flow through said crank shaft bore, there being a restricted air flow passage in shunt of said check valve for preventing undue air pressure build up in said reservoir.

ROY D. BUELL.
OLIVER H. SIMMONS.

REFERENCES CITED

The following references are of record in the file of this patent:

UNITED STATES PATENTS

| Number | Name | Date |
|---|---|---|
| 904,132 | Johnston | Nov. 17, 1908 |
| 1,967,001 | Vorech et al. | July 17, 1934 |
| 2,046,667 | Williams | July 7, 1936 |
| 2,204,814 | Newell | June 18, 1940 |
| 2,243,466 | Kucher | May 27, 1941 |
| 2,246,868 | Trask | June 24, 1941 |

FOREIGN PATENTS

| Number | Country | Date |
|---|---|---|
| 7,250 | Great Britain | 1915 |
| 10,667 | Great Britain | 1913 |
| 87,035 | Sweden | 1936 |
| 314,273 | Germany | 1918 |